United States Patent [19]
Szczęsny et al.
[11] Patent Number: 4,514,300
[45] Date of Patent: Apr. 30, 1985

[54] DEHYDRATING CENTRIFUGAL SIEVE

[75] Inventors: Adolf Szczęsny; Reiner Kleinert, both of Zabrze; Antoni Jędo, Gliwice; Zygmunt Gutorski, Katowice, all of Poland

[73] Assignee: Centrum Mechanizacji Gornictwa "Komag", Gliwice, Poland

[21] Appl. No.: 521,564

[22] Filed: Aug. 9, 1983

[30] Foreign Application Priority Data

Aug. 16, 1982 [PL] Poland .................................. 237942

[51] Int. Cl.$^3$ .............................................. B01D 21/26
[52] U.S. Cl. .................................... 210/342; 210/456; 210/512.1
[58] Field of Search ............... 210/155, 162, 252, 255, 210/256, 261, 262, 304, 315, 342, 512.1, 519, 456

[56] References Cited

U.S. PATENT DOCUMENTS

| | | | |
|---|---|---|---|
| 2,447,286 | 8/1948 | Smith et al. | 210/519 X |
| 3,232,436 | 2/1966 | Nilsson | 210/304 X |
| 3,519,130 | 7/1970 | Jachna | 210/304 X |

FOREIGN PATENT DOCUMENTS

| | | | |
|---|---|---|---|
| 46606 | 3/1963 | Poland . | |
| 1097941 | 1/1968 | United Kingdom . | |
| 1176398 | 1/1970 | United Kingdom | 210/304 |

*Primary Examiner*—Richard V. Fisher
*Assistant Examiner*—W. Gary Jones
*Attorney, Agent, or Firm*—Ladas & Parry

[57] ABSTRACT

The invention relates to a dehydrating centrifugal sieve of small overall dimensions, small weight and big yield. The sieve is appropriated for dehydration, de-sludging, enrichment and classification of mineral grains.

The sieve according to the invention has in a common housing (1) several conical sieve elements (2), (12), (13) disposed successively under each other and at the same time inside each other. Between particular sieve elements there are funnels (4) terminated at the bottom with a circumferential gutter (5). The circumferential gutter (5) is connected by pipe passages (6) situated in an offtake (7) of granular concentrate through a flow-off surface (9) with an offtake (10) of clarified liquid.

2 Claims, 3 Drawing Figures

DEHYDRATING CENTRIFUGAL SIEVE

Figure 1:
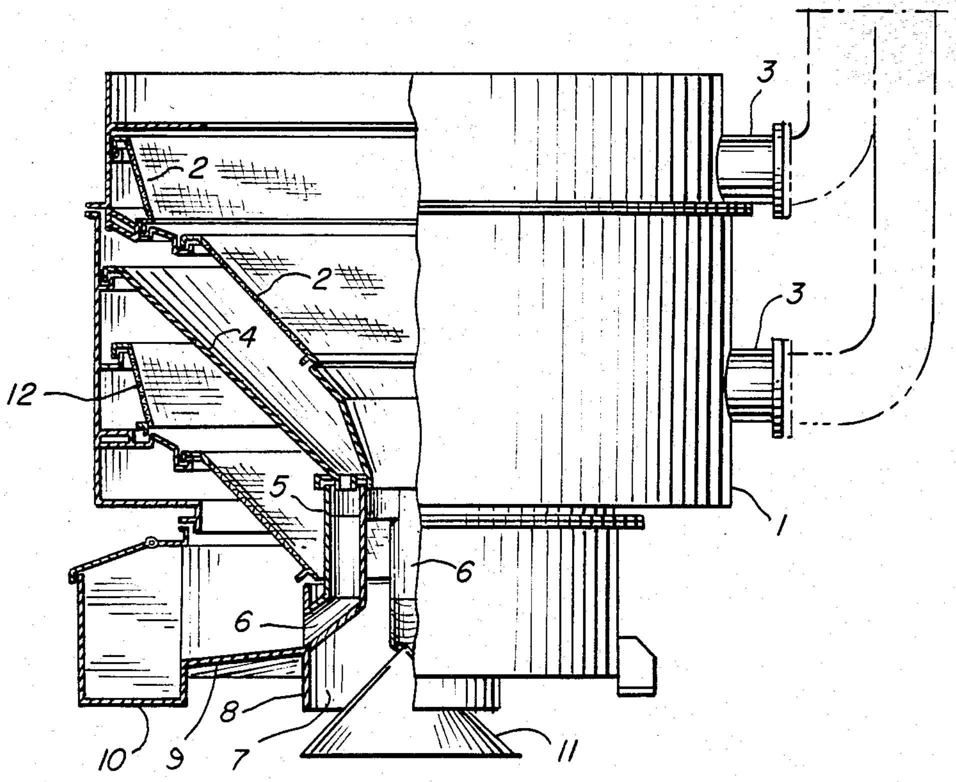

The subject of the present invention is a dehydrating centrifugal sieve for dehydration of fines and sludges of different minerals, especially of coal in processing plants of mines.

Those skilled in the art know a dehydrating centrifugal sieve according to the British Pat. No. 1097941. In the said sieve onto a conical sieve element made most often of profiled bars forming between themselves slits of a required clearance a mixture of water and a mineral is fed under a corresponding pressure, tangently to the surface of the sieve element through a correspondingly shaped nozzle. The mixture subjected to the action of centrifugal force rotates on the sieve element, whereby water passes through slits and is collected in the housing and drained to the outside of the sieve, whereas dehydrated concentrate slides down along the conical surface of the sieve element to its centre and the concentrate outlet situated therein. Sieves of this type are produced in different design versions and in different sizes depending on the required yield. At high yields the diameters of sieve elements must be correspondingly big. Therefore, overall dimensions and weight of sieves are considerable. Besides, at an increased diameter the pile-up height of the output supply of the mixture being dehydrated must be appropriately increased, which is not always possible in definite technological systems. For these reasons dehydrating centrifugal sieves are only of diameters below 4 meters. For bigger yields either separate sieves operating parallely are built or double sieves wherein the mixture fed centrally is separated onto two sieve elements disposed one beside the other in a common housing. Such systems occupy, however, a very big space and weights of sieves are also very big.

From the U.S. Pat. No. 3,519,130 a tandem system of sieves disposed one below the other is known. The sieve according to the said patent is designed, however, for dehydrating by means of a stream of additional, so called washing liquid. In this device each sieve element has for the washing liquid a separate nozzle and a separate gutter. A disadvantage of this system is its considerable height, overall dimensions and big weight, which cannot be reduced because clarified liquid is drained from each stage outside the sieve element.

The object of the present invention is the design of a dehydrating centrifugal sieve of big yield but of small overall dimensions and weight. The essence of the invention consists in that in a common housing there are several conical sieve elements disposed one above the other. Sieve elements are at the same time to a considerable extent disposed one inside the other which is enabled by their conical shape. Particular sieve elements are separated by conical funnels terminated at the bottom with a circumferential gutter. Circumferential gutters are connected by pipe passages situated in the offtake of the concentrate through a flow-off surface with the offtake of clarified liquid. Feeding nozzles of particular sieve elements are directed in opposite directions. It is preferable when particular sieve elements are of the same dimensions. The flow-off surface between the pipe passage and the offtake of clarified liquid is in a form of a cone. The flow-off surface can be inclined in relation to the axis of the sieve in the direction of the offtake of clarified liquid. The offtake of the concentrate has the stub pipe in a form of a cone contracting downwards. In the lower part of the offtake of concentrate there is a distributing cone whose biggest diameter is bigger from the diameter of the offtake of concentrate grains.

A mixture of a liquid and grains of a mineral subjected to the dehydration process in the device according to the invention is fed under pressure from nozzles to particular sieve elements. The liquid after penetrating the upper sieve elements flows down along funnels towards the interior of the sieve into the circumferential gutter. From the gutter the liquid is drained by pipe passages onto the flow-off surface in the lower part of the housing of the sieve, along which it flows down to the offtake of the liquid to the outside of the sieve. Clarified liquid from the lowest sieve element falls down directly on the flow-off surface over which it flows down to the offtake of the liquid. Granular concentrate slips down over conical surfaces of sieve elements toward the centre of the sieve to the disposed therein offtake of concentrate common for all sieve elements. Each sieve element is supplied by a separate nozzle. Thus, feeding nozzles are situated on different levels. Since, however, differences of heights between particular sieve elements are not big, differences of the height of pile-up of supplying particular elements caused thereby do not have any significant effect on the operation of the sieve.

Due to the mode of operation of the sieve profiled bars forming the working surface of the sieve wear at one side.

The time of operation of sieve elements can be prolonged by changing periodically the direction of centrifuging the mixture being dehydrated. To enable this sieve elements have the same dimensions and are interchangeable. Due to the fact that feeding nozzles of particular stages are directed in the opposite directions it is possible to interchange periodically sieve elements between particular stages, which prolongs their total time of operation.

In certain cases the width of offtake of the concentrate is significant, for example, by a conveyor of a given width situated under the sieve. If the offtake width is to be smaller from the width of central holes in sieve elements, this is obtained by conical configuration of the concentrate offtake stub pipe. If the offtake width is to be bigger from the diameter of holes in sieve elements, then in the lower part of the offtake a distributing cone of a corresponding diameter is placed. Concentrate while slipping down over the cone achieves the required offtake width. In case when not only the offtake width of concentrate is significant but also uniform density of concentrate over the whole width of the offtake, this is obtained by special shaping the offtake stub pipe or the distributing cone. To facilitate flow-off of clarified liquid the flow-off surface forming the bottom of the housing of the sieve has a conical shape or is inclined in the direction of the offtake of clarified liquid.

The sieve according to the invention has small dimensions, small weight and can be applied in processes of dehydration, de-sludging, enrichment and classification of minerals in different technological systems.

Figure 2:
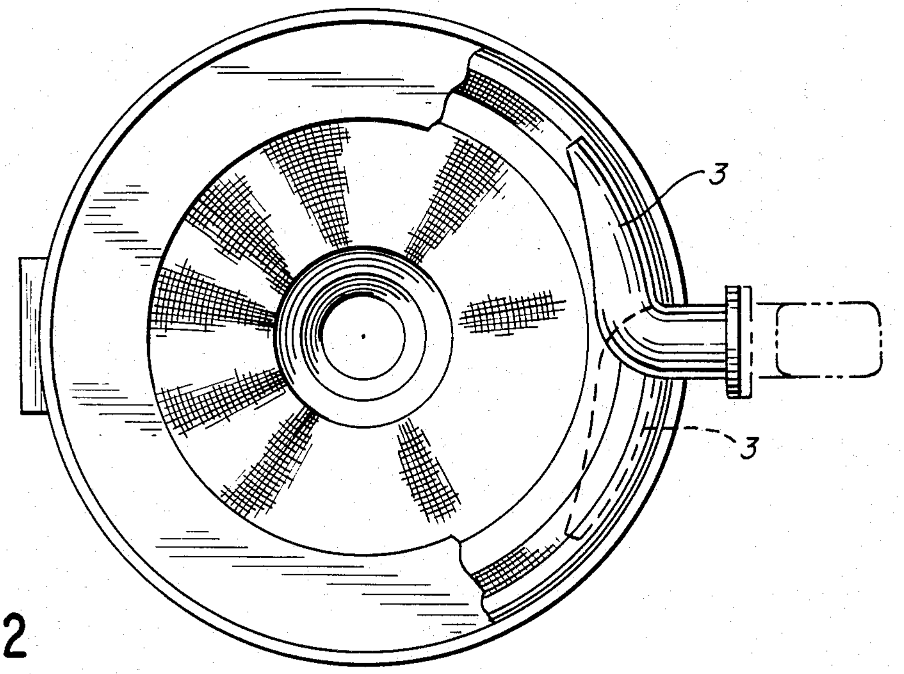
Figure 3:
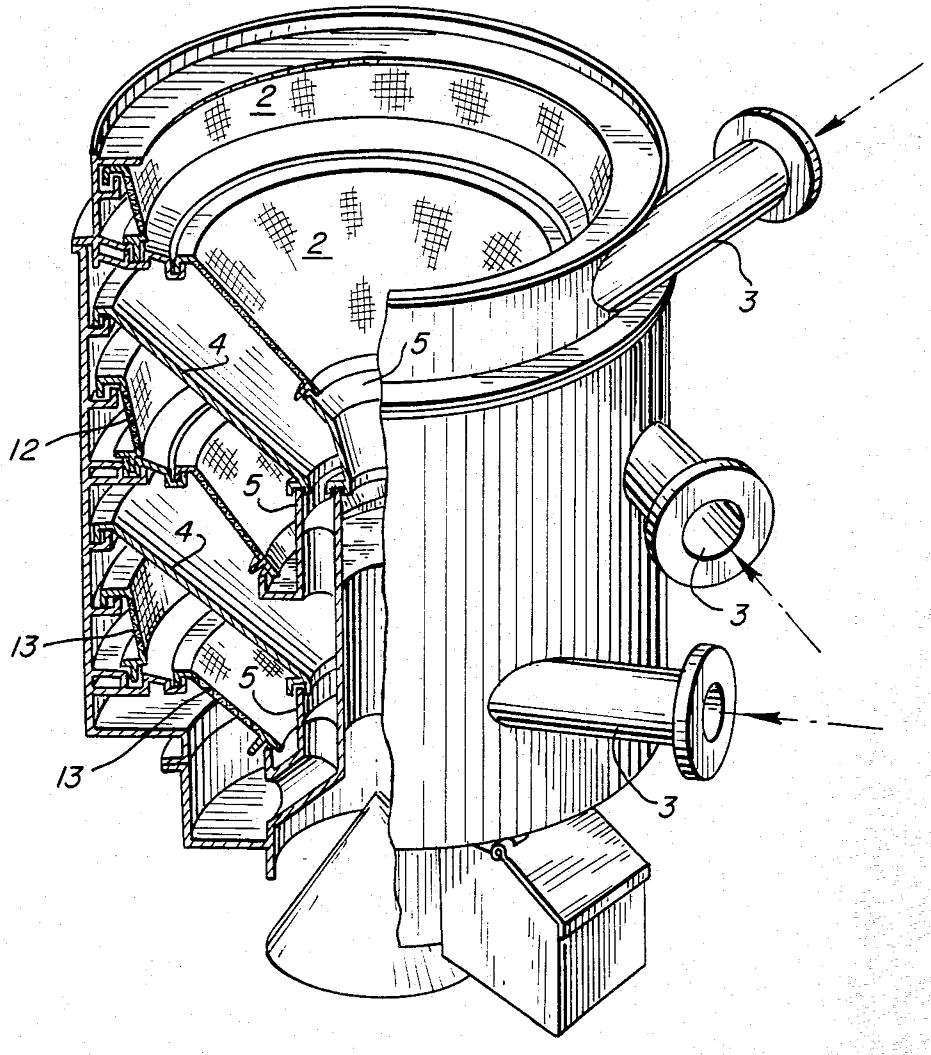

The subject of the invention is presented in an example of its embodiment in the drawing in which FIG. 1 shows a side view and a partial axial section of a device with two sieve elements, FIG. 2—a top view of the sieve, and FIG. 3—a device with three sieve elements.

A housing 1 encloses sieve elements 2 and 12 disposed one below the other, whereof each has its feeding nozzle 3. Under the upper sieve element 2 there is a funnel 4 terminated with a circumferential gutter 5 with pipe passages 6 placed in an offtake 7 of concentrate with a stub pipe 8. The housing 1 is closed from below by a flow-off surface 9 with offtake 10 of clarified liquid. In the lower part of the stub pipe 8 a distributing cone 11 is situated. The operation of the sieve according to the invention is, as follows: a mixture fed under pressure by nozzles 3 onto sieve elements 2, 12 is put in a spiral motion, whereby the liquid passes through slits of sieve elements 12. The liquid separated and clarified on the upper sieve element 2 flows down by the funnel 4 to the circumferential gutter 5, and then by pipe passages 6 onto the flow-off surface 9 and to the offtake 10. The liquid separated on the lower sieve element 12 falls down directly on the flow-off surface 9 and flows down over it to the offtake 10. Granular concentrate from both sieve elements slips down over their conical surfaces to the offtake 7. Falling down concentrate is distributed over the required width by a conical stub pipe 8 or by a distributing cone 11.

The sieve in the embodiment shown in FIG. 3 is formed of three sieve elements 2, 12, 13 in a common housing 1. A mixture of a liquid and grains is fed under pressure by three nozzles 3 onto particular sieve elements. Between the sieve element 2 and the sieve element 12 there is a funnel 4 and between the sieve element 12 and the sieve element 13 there is also a funnel 4. The liquid clarified on the upper sieve elements 2 and 12 flows down along funnels 4 toward the inside of the sieve to circumferential gutters 5, and then from both gutters 5 onto the flow-off surface 9 to the offtake 10. Granular concentrate from three sieve elements slips down their conical surfaces to the offtake 7.

What is claimed is:

1. A dehydrating centrifugal sieve assembly for separating solid particles from liquids, comprising a housing and at least two generally conical shaped sieves in the form of inverted frustum cones mounted in the housing, disposed one below the other and substantially nested one inside the other, each two adjacent conical sieves being separated from each other by a funnel also of an inverted generally conical shape and nested therebetween, each funnel having a bottom center portion with a circumferential liquid collecting gutter, each conical sieve having an upper circumference and having an input nozzle connected approximately tangentially to said sieve adjacent said upper circumference, a particulate discharge conduit means situated in a central bottom portion of each conical sieve and being arranged vertically and interconnected to a single discharge, a clarified liquid discharge means being situated on a radially outward side near the bottom of the housing, each of said circumferential gutters having passage means vertically situated inside the discharge conduit means, and connected with a collecting chamber for the clarified liquids, said chamber being situated under the lowest conical sieve within the housing and above a flow-off surface on a bottom portion of the housing.

2. An assembly according to claim 1, wherein said input nozzles feeding the adjacent conical sieves are directed in opposing tangential directions.

* * * * *